United States Patent

[11] 3,622,236

| [72] | Inventor | John R. Novy |
| | | Elmhurst, Ill. |
| [21] | Appl. No. | 16,438 |
| [22] | Filed | Mar. 4, 1970 |
| [45] | Patented | Nov. 23, 1971 |
| [73] | Assignee | Southern Illinois University Foundation |
| | | Carbondale, Ill. |

[54] IMAGE DISPLAY DISSOLVE CONTROL
19 Claims, 2 Drawing Figs.

[52] U.S. Cl. .................................................. 353/86, 353/94
[51] Int. Cl. ........................................... G03b 21/20
[50] Field of Search ................................. 353/94, 30, 86, 83; 179/100.2 A

[56] References Cited
UNITED STATES PATENTS
| 1,282,743 | 10/1918 | Brenkert .................. | 353/86 |
| 3,480,738 | 11/1969 | Meyer et al. ............. | 179/100.2 A |

FOREIGN PATENTS
| 1,472,116 | 1/1969 | Germany .................... | 353/86 |

Primary Examiner—William D. Martin, Jr.
Attorney—Koenig, Senniger, Powers and Leavitt ABSTRACT: Apparatus controls image intensity and image change timing of images produced by a plurality of image display devices. Included is a voltage integrator which produces at its output a first control voltage the magnitude of which varies as a time integral of a voltage applied to its input. Circuitry is provided which applies to the input of the voltage integrator a substantially constant voltage of a controlled polarity and of a preselected magnitude which represents a preselected image intensity rate of change. An inverter interconnected with the voltage integrator produces a second control voltage whose magnitude varies as an inverse function of the first control voltage. First and second control circuits are interconnected with the voltage integrator and with the inverter, respectively, for causing image changing and varying image intensity of images produced by a respective image display device in accordance with the respective control voltages. Accordingly, image intensity and image change timing of images displayed by the devices are coordinated to cause smoothly dissolving alternating successive display of images.

3,622,236

IMAGE DISPLAY DISSOLVE CONTROL

BACKGROUND OF THE INVENTION

The present invention relates to apparatus for displaying images and more particularly to apparatus for controlling image intensity and image change timing to cause smoothly dissolving alternating successive display of images produced by image display devices.

In audiovisual presentation using image display devices such as slide projectors, a highly effective visual technique is to have each projected image dissolve smoothly into the next in a manner such as to cause a smooth visual transition from one image to the next, as compared with abruptly changing the image. This may be done by employing a pair of slide projectors which display their images on a single screen space. It has heretofore been suggested to use electromechanical devices, such as motor-driven potentiometers, for varying the level of energization of the projector bulb in each projector in timed relation with the changing of the slides. Such electromechanical approaches of the prior art suffer from a number of disadvantages, such as being large, complex, and unreliable or otherwise prone to failure. Further, they are typically inflexible in use, being not readily adjusted to a wide range of dissolve rates. Motor-driven arrangements are further inflexible in typically being severely limited as to dissolve rate, e.g., in not permitting a very rapid image dissolving.

SUMMARY OF THE INVENTION

Among the several objects of the invention may be noted the provision of apparatus for controlling image intensity and image change timing of images displayed by a plurality of image display devices, each of which is adapted to display images on a single screen space; the provision of such apparatus which causes image intensity and image change timing of images displayed by the image display devices to be coordinated, so as to cause smoothly dissolving alternating successive display of images; the provision of such apparatus which is relatively simply constructed, which may be compact and lightweight in construction, which is extremely flexible and, in using solid-state circuitry, is highly reliable in operation. Other objects and features will be in part apparent and in part pointed out hereinafter.

Briefly, apparatus of the invention is adapted to control image intensity and image change timing of images displayed for first and second image display devices, both of which are adapted to display images on a single screen space. Included in the apparatus is a multiplexer circuit which functions as a means for generating a substantially constant voltage of a magnitude representing a preselected image intensity rate of change. Means, e.g., a flip-flop, is interconnected with the multiplexer circuit for reversing the polarity of the constant voltage at preselected image change timing intervals. A voltage integrator serves as a ramp generator and is interconnected with the multiplexer circuit and includes an input to which the constant voltage is supplied so as to produce a first control voltage the magnitude of which varies as a ramp function of both the magnitude and polarity of the constant voltage. An inverter is interconnected with the ramp generator and produces a second control voltage whose magnitude varies as an inverse ramp function of the first control voltage. A first image intensity control circuit is interconnected with the ramp generator and functions as a means for varying energization of image illuminating means, e.g., a bulb, of a first image display device in accordance with the first control voltage, thereby to vary image intensity. A first voltage-responsive switching circuit is interconnected with the ramp generator and operates to energize image changing means, i.e., a slide changer, of the first image display device at a predetermined magnitude of the first control voltage. Similarly, a second image intensity control means and a second voltage-responsive switching circuit are interconnected with the inverter and function respectively to vary energization of the illumination means of a second image display device and to energize image changing means of the second display device at a predetermined magnitude of the second control voltage. Accordingly, image intensity and image change timing of images displayed by the image display devices are coordinated to cause alternating successive display of images by said devices, which images smoothly dissolve one into another.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
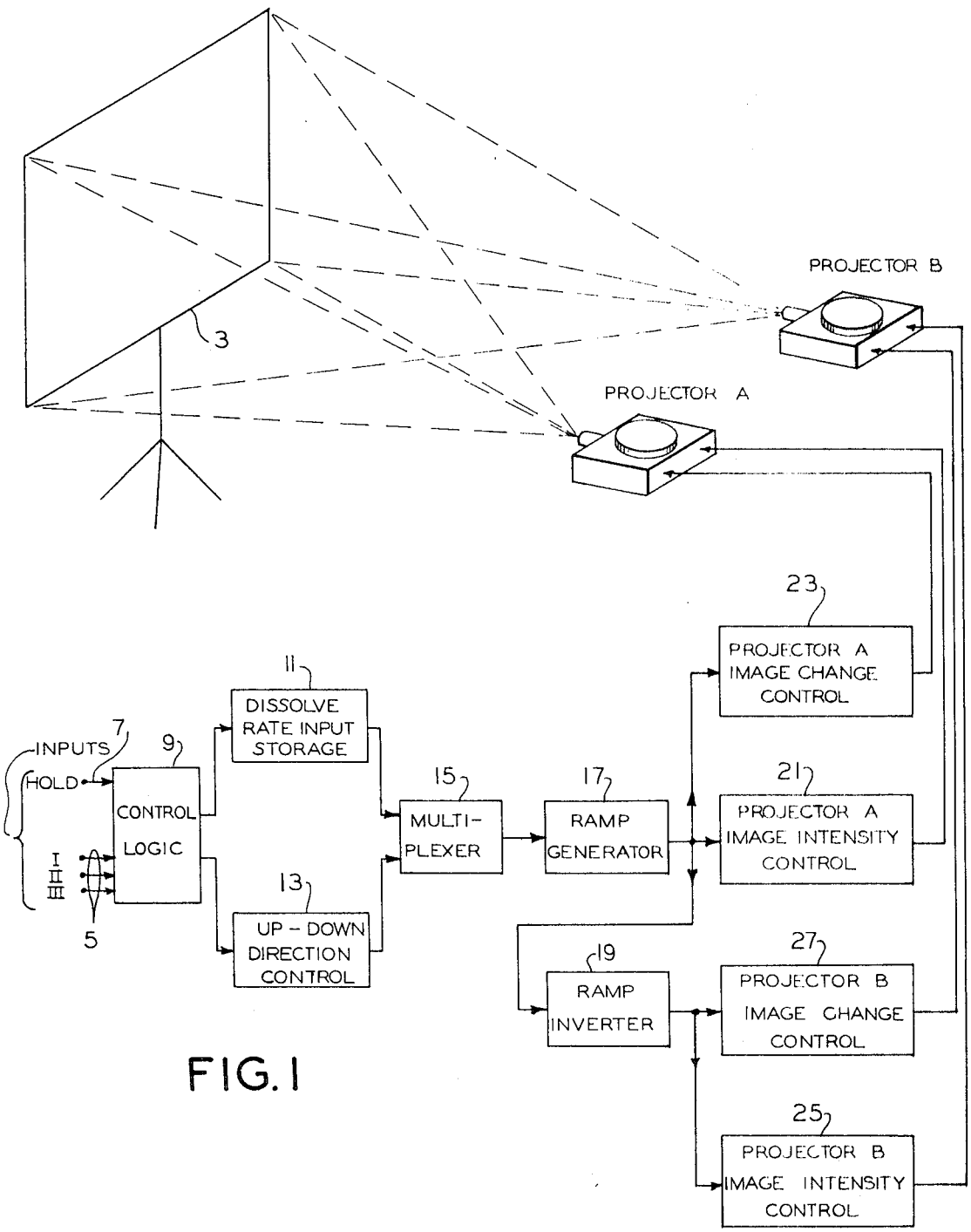
FIG. 1 is a block diagram of apparatus of the invention shown interconnected with a pair of slide projectors for controlling image intensity and image change timing.

Referring now to FIG. 1, apparatus of the present invention is shown interconnected with a pair of image display devices, i.e., a pair of slide projectors designated A and B, each of which is adapted to display slide images on the single screen space of a projector screen 3. Each of projectors A and B is of the type having electrically energized illuminating means and image changing means which are controlled by apparatus of the invention to cause alternating successive display of images by the projectors, with each image dissolving into the next to provide a smooth visual transition from one image to the next.

The apparatus includes a plurality of inputs designated generally at 5, each including a terminal for receiving a momentary control signal input which represents a preselected dissolve rate, i.e., an image intensity rate of change. Three such inputs 5 are shown and the input terminals are individually labeled I, II and III, representing three separate dissolve rates such as fast, medium and slow, respectively. The control signals applied to inputs 5 may be constituted by voltages switched to respective ones of these inputs by conventional switching means, or may be constituted by electrical control signals derived from apparatus such as disclosed in the coassigned application of Herbert J. Meyer et al., Ser. No. 546,794, entitled Image Display Apparatus and Methods, and now U.S. Pat. No. 3,480,738, issued Nov. 25, 1969, and relating to apparatus for operating a plurality of image display devices in timed relation with the playing of a recorded audioprogram. Signals applied to inputs 5 act not only to preselect an image dissolve rate but to cause image changing as well. A further input 7, labeled HOLD, is provided to cause the apparatus to "hold" a dissolve cycle at a particular point for a special effect which will be described hereinbelow.

The various inputs are fed to control logic circuitry indicated at 9 which couples the input signals into certain portions of the apparatus, including dissolve rate input storage circuitry indicated at 11 and up-down direction control circuitry indicated at 13. The rate input storage circuitry 11 acts as a means for continuously generating control signals in response to respective momentary control signal inputs applied to inputs 5. Each of these continuously generated control signals represents a stored preselected image rate of change. Thus the storage circuitry 11 in effect acts as a memory for remembering which image intensity rate of change was selected by a momentary signal input at one of the inputs 5 to control logic 9.

The continuously generated control signals are supplied to a multiplexer 15 whose circuitry generates a substantially constant voltage of a magnitude representing a preselected image intensity rate of change, i.e., an image dissolve rate. The polarity of this constant voltage is controlled by the up-down direction circuitry 13 which acts, in this regard, as a polarity reversing means. This substantially constant voltage is applied to the input of a ramp generator 17 which is constituted by a voltage-integrating circuit which is operative to produce at its output a first control voltage the magnitude of which varies as the time integral of the voltage applied to its input. Thus the magnitude of the control voltage varies as a ramp function of both the magnitude and polarity of the constant voltage delivered by multiplexer 15. A ramp inverter circuit 19 is connected with ramp generator 17 and produces a second control voltage the magnitude of which varies as an inverse ramp function of the first control voltage.

Interconnected with ramp generator 17 is a first image intensity control 21 which is operative to vary the energization of image illumination means of projector A in accordance with the first control voltage, i.e., that voltage generated by ramp generator 17, thereby to vary image intensity. An image change control 23 for projector A is also interconnected with ramp generator 17 and operates to energize image changing means of projector A at a predetermined magnitude of this first control voltage.

Similarly, for projector B there is an image intensity control 25 interconnected with ramp inverter 19 for varying the energization of image illumination means of projector B in accordance with the second control voltage, i.e., that voltage delivered by ramp inverter 19, thereby to vary image intensity. An image change control 27 for projector B is constituted by a second voltage-responsive switching circuit. The circuitry is also connected with ramp inverter 19 and operates to energize the image changing means of projector B at a predetermined magnitude of the second control voltage.

Figure 2:
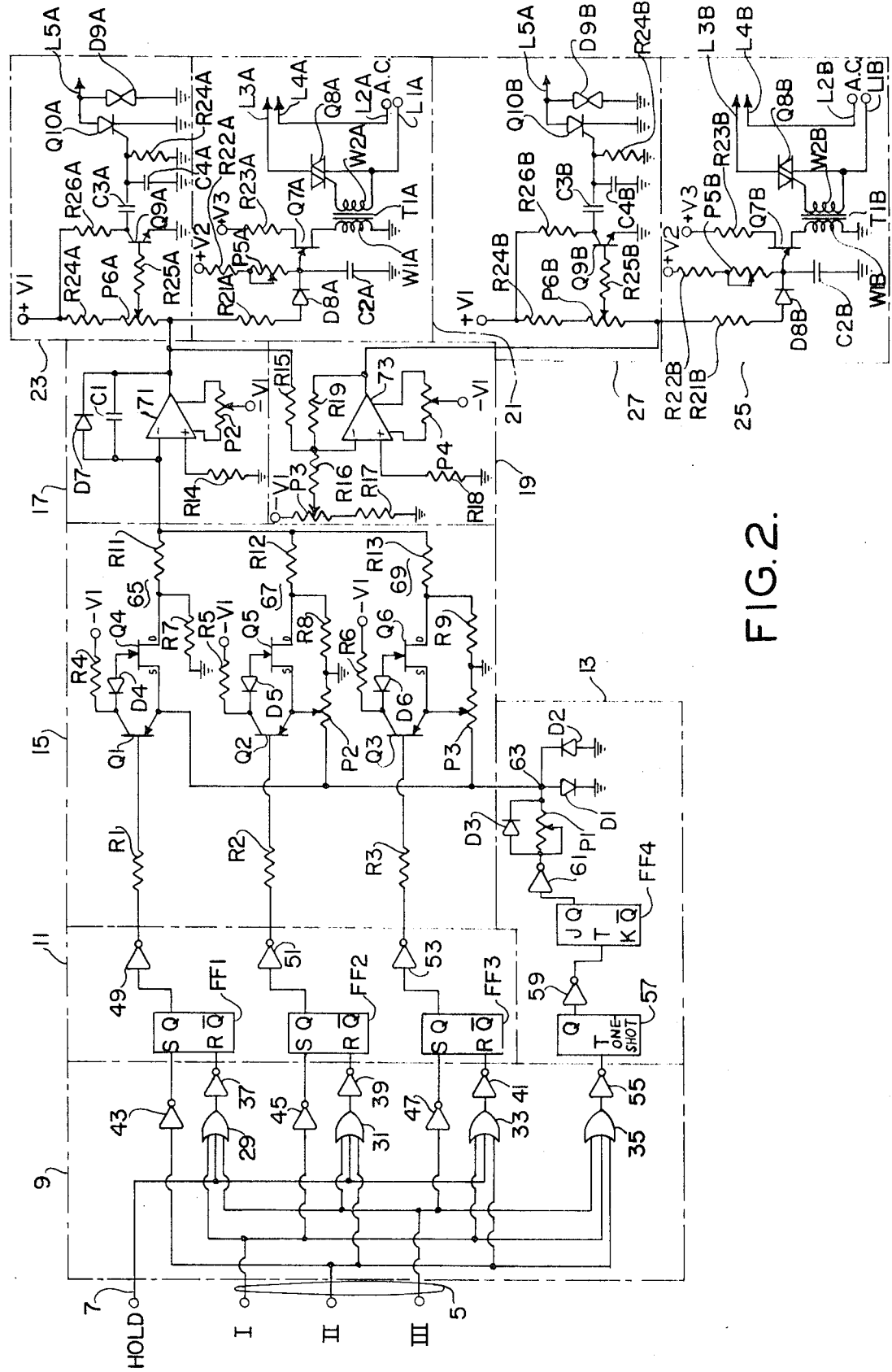
FIG. 2 is a schematic circuit diagram of circuitry of the apparatus corresponding to the block diagram of FIG. 1.

Referring now to FIG. 2, the control logic circuitry 9 includes four three-input logic OR-gates 29, 31, 33 and 35. OR-gates 29, 31 and 33 correspond to individual dissolve rate input terminals I, II and III, respectively. To each of these latter three gates is supplied the hold input 7 and two of the dissolve rate inputs other than the one associated with that particular gate. For example, gate 29 has an input from the hold input 7 and from the individual dissolve rate input terminals II and III. The three inputs to OR-gate 35 are provided by the three dissolve rate inputs I, II And III.

Each of the output terminals of the first three OR-gates 29, 31 and 33 is interconnected with a respective inverter amplifier 37, 39 and 41 whose respective output terminals are connected to the reset inputs of three flip-flops FF1, FF2 and FF3 which are part of the dissolve rate input storage circuitry 11. The set inputs of flip-flop FF1–FF3 are provided from the outputs of respective inverting amplifiers 43, 45 and 47, each of which derives its input from a respective signal at one of the dissolve rate input terminals I, II and III. Each of the inverting amplifiers in the FIG. 2 circuit may comprise simply a conventional integrated circuit logic gate having an output which is the inverse of its input.

As may be seen from the foregoing, each of flip-flops FF1–FF3 corresponds to a respective one of input terminals I, II and III. Action of this control logic circuitry 9 is such that when a voltage is applied to one of the input terminals of inputs 5, the corresponding flip-flop is set and the remaining two flip-flops are reset. For example, a voltage at input terminal III sets flip-flop FF3 and resets flip-flop FF1 and FF2. As those skilled in the art known, each of these flip-flops is operative to deliver a so-called Q output or logic "1" when it is set. The Q outputs of flip-flops FF1–FF3 are supplied as inputs to a respective one of three inverting amplifiers 49, 51 and 53 which are a part of the dissolve rate input storage circuitry 11. The $\bar{Q}$ or logic "0" outputs of flip-flops FF1–FF3 are not used.

A control signal applied to any one of terminals I, II or III also causes an output signal from OR-gate 35 which is delivered as an input signal to another inverting amplifier 55, the output terminal of which is interconnected with the triggering terminal of a monostable or so-called one-shot multivibrator 57 of the up-down direction control 13. The output terminal, designated Q, of the one-shot multivibrator 57 is connected to a further inverting amplifier 59 whose output terminal is interconnected with the toggle input T of a toggle flip-flop FF4, here represented as a J-K flip-flop whose J and K inputs are not used. One-shot multivibrator 57 is triggered each time an input is applied to one of terminals I, II or III.

This causes toggling of flip-flop FF4 with the result that the "high" condition of its Q output terminal is shifted to its $\bar{Q}$ output terminal each time this flip-flop is toggled. In other words, the Q output, which is delivered to a further inverting amplifier 61, is alternatively high and then low.

The output of the inverting amplifier 61 is delivered through an adjustable resistance constituted by a rheostat-connected potentiometer P1 to a point 63. A pair of diodes D1 and D2 are connected with opposite polarity from point 63 to ground. A diode D3 is connected across the resistance of potentiometer P1 so that when the voltage of the output terminal of inverting amplifier 61 is positive, potentiometer P1 is shunted out of the circuit by conduction by diode D3 but when the opposite polarity at the output terminal of amplifier 61 is present, potentiometer P1 is present in the circuit and may be adjusted to cause the negative voltage at point 63 to equal the positive voltage there, noting that as flip-flop FF4 is toggled the voltage at point 63 is alternatively positive and then negative. Diodes D1 and D2 together comprise a clamping circuit which limits the positive or negative value of the potential at point 63 to a predetermined constant value.

Each of flip-flops FF1–FF4, as well as monostable multivibrator 57, may be one of the integrated circuit types widely available from a number of commercial sources. Conventional power supply connections for such integrated circuits are not shown, of course. In integrated circuit form multivibrator 57 may be constituted by the flip-flop combination of a pair of two-input integrated circuit gates connected in a circuit well-known to those skilled in the art. Flip-flops FF1–FF4 and multivibrator 57, as well as the logic gates, may be any suitable logic type such as RTL, DTL, TTL or HTL, known to those versed in the art. If so-called low-level logic elements are used, i.e., DTL, TTL or RTL types, diodes D1 and D2 are satisfactory for clamping the voltage at point 63 with respect to ground. However, if HTL (high threshold logic) elements are employed, there should be two series pairs of diodes from point 63 to ground, one series pair having a pair of diodes connected with one polarity, the other pair having diodes connected with opposite polarity.

Multiplexer 15 includes three dissolve rate circuits 65, 67 and 69 corresponding to dissolve rate input terminals I, II and III, respectively. Each of these dissolve rate circuits includes a respective PNP transistor Q1, Q2 and Q3, the base of each of which is connected through a respective resistor R1, R2 and R3 to the respective output terminal of inverting amplifiers 49, 51 and 53. Each of these transistors has its collector biased through a respective one of resistors R4, R5 and R6 to a negative potential designated −V1, such as a Zener-diode-regulated 12 volts DC source. The collectors of transistors Q1–Q3 are also each connected through a respective diode D4, D5 and D6 to the gate terminal of a respective N–channel junction field effect transistor Q4, Q5 and Q6. The source terminal of each of these so-called JFET transistors is directly connected to the emitter of the corresponding transistor Q1, Q2 and Q3.

As those skilled in the art are aware, JFET transistors Q4, Q5 and Q6 are voltage-controlled semiconductor devices whose source and drain terminals constitute, in effect, main terminals of the device between which conductivity is controlled by the presence of a control signal at the gate or control terminal of the device. Circuitry which serves as a means for applying different predetermined voltages across respective ones of the pairs of the drain and source terminals of transistors Q4–Q6 is constituted by an interconnection of the source terminals of each of these transistors with point 63. The source terminal of transistor Q4 is directly connected with point 63 and the source terminals of transistors Q5 and Q6 are each connected to the wiper of a respective potentiometer P2 and P3 whose resistance elements are each connected between point 63 and ground.

The drain terminal of each of JFET transistors Q4–Q6 is connected through a respective resistor R7, R8 and R9 to ground. Thus it may be seen that full value of the clamped or regulated positive or negative voltage on point 63 is connected across the source and drain terminals of transistor Q4 to provide the fastest possible dissolve rate. Potentiometer P2 may be adjusted to provide a somewhat lesser constant voltage across the source and drain terminals of transistor Q5 for a slower dissolve rate. Potentiometer P3 may be adjusted to provide a still lower constant voltage across the source and drain terminals of transistor Q6 for a still lower dissolve rate.

Each of the drain terminals of transistors Q4–Q6 is connected through a respective resistor R11, R12 and R13 to the inverting input of a differential amplifier 71 of the ramp generator. The conduction of PNP transistors Q1–Q3 is adapted to control the conductivity between the source and drain terminals of the corresponding one of the JFET transistors Q4–Q6. As long as the corresponding PNP transistors is nonconductive, a negative potential is supplied through the respective resistor R4–R6 to the gate terminal of the respective JFET transistor Q4–Q6 which acts to pinch off any current flow between the source and drain terminals of the respective transistor Q4–Q6. When any one of flip-flops FF1–FF3 is set to cause that particular flip-flop to deliver a Q output signal representing a respective control signal to multiplexer 15, the respective transistor Q1–Q3 is biased into conduction. This causes conductivity between the source and drain terminals of the respective JFET transistor Q4–Q6 to be established, causing the predetermined voltage across the source and drain terminals to be applied through the respective resistor R11–R13 to the inverting input of differential amplifier 71 of the ramp inverter circuitry 19.

Differential amplifier 71 has a capacitor C1 connected between its output and its inverting input terminal, thus constituting a voltage-integrating means for producing at the output terminal a voltage the magnitude of which varies as the time integral of the voltage applied to the input. The noninverting input is biased to ground through a resistor R14. A balancing potentiometer P2 connected to inverting amplifier 71 in conventional fashion has its wiper connected to the negative source of voltage −V1 to permit the output to be zeroed. A diode D7 connected across capacitor C1 has its cathode connected to the output terminal of the differential amplifier thereby to prevent the output of the differential amplifier from becoming substantially less than zero potential (the diode limiting the negative value of the output to about −0.7 volts).

When a constant voltage is applied to the input of differential amplifier 71 by one of the dissolve rate circuits 65–69, the output voltage of the differential amplifier is a ramp function which increases linearly for one polarity of the input voltage to a constant voltage and then for the other polarity decreases linearly to a point slightly less than 0 (i.e., −0.7 volts) from which it will then once increase on reversal of polarity of the input voltage. The output of differential amplifier 71 is connected through a resistor R15 to the inverting input of a further differential amplifier 73 which is part of the ramp differential amplifier inverter circuitry 19. This inverting input also is biased through a resistor R16 to a voltage determined by the wiper of a potentiometer P3 whose resistance element is connected in series with a resistor R17 between the negative source −V1 and ground. The noninverting input of differential amplifier 73 is biased to ground through a resistor R18. A resistor R19 provides feedback from the output of the differential amplifier to its inverting input in order to provide unity gain. A balancing potentiometer P4 connected to differential amplifier 73 has its wiper connected to the negative voltage −V1 so as to permit balancing of the differential amplifier. Differential amplifier 73 acts to invert the output signal provided by the output of differential amplifier 71 and thus the output of amplifier 73 varies as an inverse function of the output voltage of differential amplifier 71. Each of differential amplifiers 71 and 73 may be of the monolithic integrated circuit variety available from a number of commercial sources.

The image intensity control circuitry 21 includes a resistor R21A and an isolation diode D8A which apply the output voltage from differential amplifier 71 across a capacitor C2A. A positive pulsating DC voltage +V2 (preferable the unfiltered full-wave rectified AC supply divided to a suitable level) is also provided through a series-connected resistor R22A and a rheostat-connected potentiometer P5A across capacitor C2A for charging of the latter during each half cycle of the AC supply at a rate determined by potentiometer P5A. Capacitor C2A is connected to the gate of a unijunction transistor (UJT) Q7A which is rendered conductive during each half cycle of the AC supply at a predetermined voltage level on capacitor C2A dependent upon the intrinsic standoff ratio of the transistor. One of the base terminals of the UJT is biased through a resistor R23A to a pulsating DC source +V3 of somewhat lower potential than source +V2, preferably derived by dividing a portion of +V2. The other base is connected through the primary winding W1A of a pulse transformer T1A to ground.

The secondary winding W2A of pulse transformer T1A has one side connected to the triggering or gate terminal of a triac Q8A so as to supply triggering pulses thereto. The other side is connected to the adjacent main terminal of the triac. As those skilled in the art are aware, triac Q8A is a triggerable semiconductor current switching device which is rendered conductive between its main terminals when a triggering potential is supplied to its gate or triggering terminal. The main terminals of triac Q8A are connected in one side of a power circuit including a pair of AC input leads L1A and L2A, the latter being connected to the 115 volt AC source. This power circuit includes a pair of output leads L3A and L4A which are connected to the projector bulb of projector A. Thus triac Q8A is connected to vary the level of energization of the bulb of projector A as the phase of triggering of the triac is varied. Each time transistor Q7A becomes conductive, a pulse is delivered by pulse transformer T1A, causing triggering of triac Q8A. Accordingly, the phase of triggering of the triac within the AC half cycle varies as a function of (i.e., is directly proportional to) the control voltage represented by the output of differential amplifier 71.

The image intensity control circuitry 25 for projector B is identical with circuit 21. Accordingly, the components in circuit 25 are designated with the characters identical with those of circuit 21 except for having the suffix B. Operation of the two circuits is identical.

The control voltage represented by the output of differential amplifier 71 is also delivered to one side of a potentiometer P6A of the projector A image change circuitry 23. The other side of potentiometer P6A is biased to the positive DC voltage source +V1 through a resistor R24A and its wiper is connected through a resistor R25A to the base of an NPN transistor Q9A. The emitter of this transistor is connected to ground and the collector is biased to the positive source +V1 through a resistor R26A. The collector of transistor Q9A is connected through a coupling capacitor C3A to the triggering terminal of a silicon controlled rectifier (SCR) Q10A. The SCR is also a triggerable semiconductor current switching device whose main terminals, i.e., cathode and anode, are rendered conductive when the device is triggered. A filtering or noise-suppression capacitor C4A, shunted by resistor R24A, is connected between the triggering terminal of the SCR and ground. The anode of the SCR is connectable by means of a lead L5A with slide changing circuitry of projector A, which is operative to cause changing of the slides whenever the circuit is grounded. For this purpose, the cathode of SCR Q10A is grounded. A bidirectional breakdown diode or so-called surgistor D9A is connected from the anode of SCR Q10A to ground in order to shunt high-voltage transients to ground which might be caused by the inductive slide change circuitry (i.e., a solenoid) of the projector.

The state of conduction of transistor Q9A is controlled by the magnitude of the control voltage delivered by ramp generator 17, transistor Q9A being normally conductive but becoming nonconductive when this control voltage drops below a predetermined magnitude. When that occurs, capacitor C3A couples a pulse to the triggering or gate terminal of SCR Q10A, causing triggering of the latter. The slide-changing mechanism for projector A is actuated whenever the SCR becomes conductive upon triggering.

The image change control 27 for projector B is substantially identical with circuit 23 and the components of the former have like numbers but with the suffix B, operation of circuit 27 being identical with that of circuit 23.

In operation of the present dissolve control apparatus, it is assumed that projectors A and B are loaded with slides so that the projectors will alternately display slide images in the desired sequence on the same screen space, and the circuitry is connected as described to the projector bulb and slide changing mechanism of each of the projectors. A control signal voltage is applied to one of input terminals I, II and III according to whether a fast, medium or slow dissolve is desired.

For purposes of illustration, it may be assumed that this control signal e.g., of 1.8 volts) is applied to input terminal II. The logic circuitry 9 couples this signal to flip-flops FF1–FF3, causing setting of flip-flop FF2 and resetting of flip-flops FF1 and FF3. The one-shot multivibrator 57 is also triggered and supplies a pulse, causing triggering or so-called toggling of flip-flop FF4, whose Q output may be either positive or negative. Assuming it to be originally negative, triggering of flip-flop FF4 causes the Q output to become positive. Hence, a positive voltage, clamped to a constant absolute value by one of diodes D1 and D2, is delivered to each of the individual circuits 65–69 of multiplexer 15.

Each of transistors Q1–Q3 is ordinarily conductive but is biased into a nonconductive state when the respective flip-flop FF1–FF3 is set (this causing the output of the respective inverting amplifier 49–53 to be low). Hence, the setting of flip-flop FF2 noted previously results in transistor Q2 becoming nonconductive. This in turn causes transistor Q5 to be biased into conduction. Transistors Q1 and Q3 remain conductive so that the JEFT's Q4 and Q6 remain pinched off. As to circuit 67, the setting of potentiometer P2 is assumed to be set for dividing the voltage across point 63 to a predetermined value. Hence, this predetermined voltage, which is positive as noted previously, is dropped across resistor R8 and applied through resistor R12 to the inverting input of differential amplifier 71 which integrates the voltage as a function of time and thereby produces at its output a linearly increasing voltage having an increasing ramp characteristic and which is applied via resistor R21A and diode D8A across capacitor C2A. Noting that source +V2 also applies a DC voltage pulsating at twice the AC supply frequency across this capacitor, it will be seen that unijunction transistor Q7A becomes conductive once during each half-cycle of the AC supply, the conduction or so-called firing angle being a function of the output voltage of differential amplifier 71. Transformer T1A couples a triggering pulse to the gate of triac Q8A each time transistor Q7A conducts. As the output voltage of amplifier 71 increases, the firing angle for the triac advances, and thus the level of energization of the projector bulb in projector A is gradually increased, resulting in increasing image intensity.

Since the output voltage of differential amplifier 73 varies inversely with the output voltage of differential amplifier 71, it may be appreciated that a linearly decreasing voltage is applied across capacitor C2B. Since the operation of circuit 25 is identical with the operation of circuit 21, the effect of this linearly decreasing voltage is to cause the triggering angle of triac Q8B to decrease, causing a concomitant decrease in intensity of the image produced by projector B. Thus this image dissolves smoothly into the image produced by projector A.

When the output voltage of differential amplifier 73 drops to a predetermined value (approximately zero volts), transistor Q9B switches from a conductive state to a nonconductive state. When this occurs, a pulse is coupled through capacitor C3B which causes triggering of SCR Q10B. This results in actuation of the image change mechanism of projector B and thus the slide in the latter is changed at a point when there is effectively no visible intensity of the projector B image. The output of differential amplifier 71 increases only to its maximum value, at which it remains. The image produced by projector A is then at substantially maximum intensity and may be observed as long as desired.

When it is desired to change a "dissolve" to the next image, a signal is again applied to input terminal II, assuming that dissolution is to be carried out at the same dissolve rate as previously. Flip-flops FF1–FF3 remain in the reset, set, and reset conditions, respectively. Thus it may be said these flip-flops "remember" the previous dissolve rate. In any case, the continued "low" output of inverting amplifier 51 continues to bias transistor Q2 so that the latter remains nonconductive, with the result that JFET Q5 remains biased into conduction.

The application of a signal to terminal II (or any of the other two input terminals) again triggers the one-shot multivibrator 57 which in turn toggles flip-flop FF4. As a result, the polarity of the Q output thereof becomes negative and diode D2 clamps the resultant negative voltage at point 63 to the same absolute value as when positive. Accordingly, potentiometer P2 now has across it the same constant voltage but of opposite polarity and the divided value at the wiper thereof is applied to the noninverting input of differential amplifier 71 whose output, as just described, is at a maximum value. As the differential amplifier integrates the applied negative input voltage as a function of time, the output voltage thereof decreases linearly in a decreasing ramp characteristic. This decreasing voltage is supplied to circuits 21 and 23. Since the output of differential amplifier 73 is the reverse of this characteristic, the signal supplied to circuits 25 and 27 is a decreasing voltage.

As a result of the previously described triggering action of the UJT's Q7A and Q7B, the decreasing voltage causes the firing angle of triac Q8A to decrease thereby decreasing the intensity of the slide image produced by projector A. The decreasing voltage supplied to circuit 25 by differential amplifier 73 causes the firing angle of triac Q8B to increase. The level of intensity of the image produced by projector B increases accordingly and thus the projector A image dissolves smoothly into the projector B image.

When the output voltage of differential amplifier 71 drops to a predetermined value, transistor Q9A switches from a conductive state to a nonconductive state. The resultant pulse coupled through capacitor C3A triggers SCR Q10A, causing actuation of the slide change mechanism of projector A. This slide changing occurs at a time when the projector bulb of projector B is effectively completely extinguished.

When the output voltage of differential amplifier 71 has dropped to approximately −0.7 volt, it remains constant there because of diode D7; hence the magnitude of the output voltage of differential amplifier 73 remains at a constant maximum positive value. The projector B image may then be observed as long as desired.

The above-described dissolve cycle, illustrating the use of terminal II giving a medium dissolve rate, may take place in approximately three seconds. A suitable fast or "snap" change dissolve rate (controlled by multiplexer circuit 65) may result in a dissolve cycle or approximately 0.1 second. A suitable slow dissolve cycle (controlled by multiplexer circuit 69) may occur in approximately 15 seconds.

The "hold" input 7 allows the dissolve cycle to be stopped at any point in the cycle. When a voltage (e.g., of +1.8 volts) is applied to the input terminal designated HOLD, flip-flops FF1–FF3 are each reset; hence none of the individual multiplexer circuits 65–69 applies an input voltage to differential amplifier 71. Accordingly, the output voltage thereof remains constant, causing the level of intensity of the projected images to remain constant. In using this "hold" feature to advantage, it may be desired to allow the progressive overlapping of images on one image which is "held" on the screen. For example, a map may be displayed by projector A with a series of population growth images dissolved on top of the map image by projector B without removing the map image from the screen. This is accomplished by alternately applying a voltage to a dissolve input and the hold input. In doing this, the dissolve cycle would preferably be allowed to continue halfway before "holding." When a dissolve cycle is then initiated after "holding," the image, which was originally at full intensity, would return to full intensity and the other image would return to the off condition whereupon this projector with zero image intensity would cycle to present the next image.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for controlling image intensity and image change timing of images displayed by a plurality of image display devices, said apparatus comprising:
   voltage-integrating means for producing at the output thereof a first control voltage the magnitude of which varies as the time integral of a voltage applied to the input thereof;
   means for applying to the input of said voltage-integrating means a substantially constant voltage of a controlled polarity and of a preselected magnitude which represents a preselected image intensity rate of change;
   inverter means interconnected with said voltage-integrating means for producing at the output of the inverter means a second control voltage the magnitude of which varies as an inverse function of said first control voltage;
   first control means, interconnected with said voltage-integrating means, for causing image changing and varying image intensity of images produced by a least one image display device in accordance with said first control voltage; and
   second control means, interconnected with said inverter means, for controlling image changing and varying image intensity of images produced by a least one further image display device in accordance with said second control voltage whereby image intensity and image change timing of images displayed by said devices are coordinated to cause smoothly dissolving alternating successive display of images.

2. Apparatus as set forth in claim 1, wherein said voltage-integrating means comprises a differential amplifier and a capacitance interconnected in parallel with a diode between an inverting input terminal and an output terminal of said amplifier, thereby to provide at the output terminal of the amplifier said first control voltage which varies as a ramp function of the magnitude and polarity of said constant voltage applied to the input terminal of said amplifier.

3. Apparatus as set forth in claim 2, wherein said inverter means comprises a further differential amplifier having an inverting input interconnected with the output terminal of the first-said amplifier, the output terminal of said further amplifier providing said second control voltage which thereby varies as an inverse ramp function of said first control voltage.

4. Apparatus as set forth in claim 1, wherein said first and second control means are operative to vary image intensity in direct proportion to said first and second control voltages, respectively.

5. Apparatus as set forth in claim 4, wherein said first and second control means each comprises:
   a triggerable semiconductor current switching device including a triggering terminal and a pair of main terminals connectable in a circuit including an AC power source with electrically energizable image illumination means of an image display device; and
   means interconnected with said triggering terminal for triggering said switching device and operative to vary the phase of the triggering as a function of the respective control voltage, thereby to vary the level of energization of said illumination means.

6. Apparatus as set forth in claim 5, wherein the triggering means comprises a unijunction transistor having a base terminal connected in a circuit with said triggering terminal and an emitter terminal interconnected with a capacitance, the respective control voltage being applied across said capacitance.

7. Apparatus as set forth in claim 4, wherein said first and second control means are operative to cause image changing at predetermined magnitudes of said first and second control voltages, respectively.

8. Apparatus as set forth in claim 7, wherein said first and second control means each comprises:
   a triggerable semiconductor current switching device including a triggering terminal and a pair of main terminals connectable in a circuit with electrically energizable image changing means of an image display device, said switching device becoming conductive when triggered to cause energization of said image changing means; and
   means for triggering said switching device including a transistor whose state of conduction is controlled by the magnitude of the respective control voltage and which changes at a predetermined magnitude of the respective control voltage, and circuit means responsive to a change in the state of conduction of said transistor for delivering a triggering pulse to said triggering terminal for triggering said switching device.

9. Apparatus as set forth in claim 1, wherein the voltage-applying means comprises means for reversing the polarity of said constant voltage in response to a momentary control signal input, said first control voltage increasing for one polarity of said constant voltage and decreasing for the opposite polarity, whereby a reversal of polarity of said constant voltage causes said first and second control means to respectively vary image intensity in an opposite direction.

10. Apparatus as set forth in claim 9, wherein the voltage-applying means further comprises multiplexer means for delivering said constant voltage, said preselected magnitude thereof being dependent upon the presence of control signals at a plurality of inputs of said multiplexer means.

11. Apparatus as set forth in claim 10, wherein the voltage-applying means further comprises means for continuously generating said control signals in response to respective momentary control signal inputs, each of said control signals representing a stored preselected image intensity rate of change.

12. Apparatus as set forth in claim 11, wherein said multiplexer means comprises a plurality of voltage-controlled semiconductor devices each having a control terminal and a pair of main terminals between which conductivity is controlled by the presence of a control signal at the control terminal of the device, means for applying different predetermined voltages across respective ones of said pairs of main terminals, conductivity between a pair of main terminals being established to apply the predetermined voltage to the input of said voltage-integrating means whenever a respective control signal is present.

13. Apparatus as set forth in claim 12, wherein each of said voltage-controlled semiconductor devices comprises a field effect transistor, said main terminals being constituted by the source and drain terminals of said transistor.

14. Apparatus as set forth in claim 12, wherein the polarity reversing means comprises a toggle flip-flop having one of its outputs interconnected with a main terminal of each of said pairs of main terminals, the polarity of the voltage appearing at said one of the flip-flop outputs reversing in response to a momentary control signal input to the trigger input of said flip-flop.

15. Apparatus as set forth in claim 14, wherein the means for applying different preselected voltages comprises voltage divider means interconnected with said one of the flip-flop outputs for dividing the voltage at said one of the outputs to said different preselected voltages.

16. Apparatus as set forth in claim 15, including diode means interconnected with said one of the flip-flop outputs for clamping the voltage appearing at said one output to a constant absolute value.

17. Apparatus as set forth in claim 14, wherein said means for continuously generating said control signals comprises a plurality of set-reset flip-flops, one for each of said voltage-controlled semiconductor devices, a corresponding one of the outputs of each of said set-reset flip-flops being connected in a circuit with a control signal input terminal of a respective one of said semiconductor devices.

18. Apparatus as set forth in claim 17, including a control signal input terminal corresponding to each of the set-reset flip-flops and logic gate means for coupling a momentary control signal input at any one of said terminals to cause setting of the respective set-reset flip-flop corresponding with said one terminal and resetting of set-reset flip-flops other than said respective flip-flops.

19. Apparatus for controlling image intensity and image change timing of images displayed by first and second image display devices, both of said image display devices being adapted to display images on a single screen space, said apparatus comprising:

means for generating a substantially constant voltage of a magnitude which represents a preselected image intensity rate of change;

means, interconnected with the constant voltage generating means, for reversing the polarity of said constant voltage at preselected image change timing intervals;

a ramp generator interconnected with the constant voltage generating means and having an input to which said constant voltage is applied, for producing a first control voltage the magnitude of which varies as a ramp function of both the magnitude and polarity of said constant voltage;

inverter means interconnected with said ramp generator for producing a second control voltage the magnitude of which varies as an inverse ramp function of said first control voltage;

first image intensity control means, interconnected with said ramp generator, for varying the energization of image illumination means of said first image display device in accordance with said first control voltage, thereby to vary image intensity;

a first voltage-responsive switching circuit interconnected with said ramp generator and operative to energize image-changing means of said first image display device at a predetermined magnitude of said first control voltage;

second image intensity control means, interconnected with said inverter means, for varying the energization of image illumination means of said second image display device in accordance with said second control voltage, thereby to vary image intensity; and a second voltage-responsive switching circuit interconnected with said inverter means and operative to energize image-changing means of said second image display device at a predetermined magnitude of said second control voltage whereby image intensity and image change timing of images displayed by said devices are coordinated to cause alternating successive display of images by said devices which images smoothly dissolve one into another.

* * * * *